United States Patent [19]

Graham et al.

[11] Patent Number: 5,628,832
[45] Date of Patent: May 13, 1997

[54] REMOVAL OF ADHESIVE FROM POLYESTER FILM

[75] Inventors: William E. Graham; Richard R. M. Jones, both of Hendersonville, N.C.

[73] Assignee: E. I. Du Pont de Nemours and Company, Wilmington, Del.

[21] Appl. No.: 410,171

[22] Filed: Mar. 24, 1995

[51] Int. Cl.$^6$ .............................. B08B 3/08; C08J 11/04
[52] U.S. Cl. .............................. 134/10; 134/29; 521/40; 521/48
[58] Field of Search .................... 134/10, 13, 15, 134/29; 521/40, 48

[56] References Cited

U.S. PATENT DOCUMENTS

| | | | |
|---|---|---|---|
| 3,928,253 | 12/1975 | Thornton et al. | 134/10 X |
| 4,324,705 | 4/1982 | Seto et al. | 134/10 X |
| 4,602,046 | 7/1986 | Buser et al. | 512/46 |
| 4,612,057 | 9/1986 | Buser | 134/13 |
| 4,799,954 | 1/1989 | Hochberg | 75/713 |
| 5,055,139 | 10/1991 | Personette | 134/22.17 |
| 5,120,768 | 6/1992 | Sisson | 521/46.5 |
| 5,127,958 | 7/1992 | Personette | 134/10 X |
| 5,185,041 | 2/1993 | Anderson et al. | 134/10 X |
| 5,286,463 | 2/1994 | Schwartz, Jr. | 423/23 |
| 5,366,998 | 11/1994 | Schwartz, Jr. | 521/40 |

*Primary Examiner*—Jill Warden
*Assistant Examiner*—Saeed Chaudhry

[57] ABSTRACT

Adhesive is removed from polyester film which is initially formed into a flake followed by a series of removal and separating steps. In a preferred mode a clarified liquid which results from stripping solution is recycled for further use in adhesive removal.

3 Claims, No Drawings

REMOVAL OF ADHESIVE FROM POLYESTER FILM

BACKGROUND OF THE INVENTION

The present invention is directed to a process for recovery of polyester film by stripping coated polyester film wherein the stripped film is of sufficient quality to recycle as a feedstock such as for direct extrusion.

Polyester film is conventionally used as a self-supporting substrate for coatings in diverse applications including photographic films, flexible packaging, and magnetic media. Photographic films utilize an adhesive coating layer to provide adhesion of a light-sensitive emulsion layer, typically a silver halide dispersed in gelatin, to the polyester film since the gelatin does not adhere well to the uncoated polyester surface. Typical adhesive coating layers used in photographic films include polyvinylidene chloride or acrylic copolymers containing acrylonitrile or vinylidene chloride.

It is desirable to strip the coating layers from discarded coated polyester films to minimize solid waste disposal and recover polyester and, in the case of x-ray and photographic films, silver constituents for recycling. Various methods have been employed to recover the silver and the polyester film from both unused ("green") and used ("black") photographic film as well as polyester film from non-silver-containing coated film. The photographic emulsion layer can be readily stripped from the underlying adhesive coating layer on the polyester film simply by subjecting the film to hot water and then the adhesive coating layer can subsequently be removed, for example, by dissolution in appropriate glycol solvents or by stripping in an aqueous alkaline stripping solution. Alternatively, the emulsion and adhesive coating layers can be stripped simultaneously, for example, by mixing the chopped photographic film flake in a hot aqueous alkaline stripping solution under high shear as described in U.S. Pat. No. 4,799,954 by Hochberg.

The prior art teaches incorporation of specific salts and surfactants in aqueous alkaline stripping solutions to disperse solid residue resulting from coating layers stripped from the polyester film. Personnette in U.S. Pat. No. 5,055,139 issued Oct. 8, 1991, teaches the use of a combination of at least 0.75 wt% trisodium phosphate and at least 0.75 wt% of alkali metal hydroxide to strip polymeric coatings from polyester substrates with recycle of the stripping solution after filtration to remove suspended coating solids. Schwartz in U.S. Pat. No. 5,286,463 issued Feb. 15, 1994, teaches a process for stripping photographic films with aqueous alkaline stripping compositions which include wetting agents, rinse aids, emulsifiers and a reducing sugar to prevent deposition of particles formed from the adhesive coating layer on the cleaned polyester film.

SUMMARY OF THE INVENTION

The present invention is directed to a process for removal of an adhesive coating layer from polyester film comprising the steps of:

(a) forming a section of film into a series of flakes (b) contacting the flakes with an aqueous alkaline stripping solution comprising a surfactant whereby the adhesive coating is removed from the polyester, (c) separating polyester flake from step (b) to recover separately polyester flake and a slurry comprising stripping solution, surfactant and a solid residue resulting from the adhesive coating layer, (d) rinsing the polyester flake with a rinse stream, (e) separating the slurry into a clarified liquid and a concentrate.

In a further embodiments of the invention, the process from steps (a) through step (c) is repeated with at least a portion of the clarified liquid from step (e) recycled into step (b) and/or (2) a portion of the clarified liquid for step (e).

DETAILED DESCRIPTION

It is conventional to coat polyester film wherein a coated layer provides the primary functional properties for an end use. The polyester film serves as a substrate in providing strength and dimensional stability. One or more coating layers are adhered to the polyester film through an adhesive layer (also conventionally called a subbing layer). The polyester film together with the adhesive layer (with or without additional coating layers) represents the starting material for use in the present invention.

The type of polyester film useful herein is not critical and typically is of commercially available material with polyethylene terephthalate and polyethylene napthalate being preferred. It is understood that comonomers can be included in these preferred polyesters e.g., up to 20% by weight additional comonomers such as aliphatic glycols and aromatic diacials or their esters.

The sole requirement for the adhesive layer which contacts the polyester film is to bond a further coating layer. Adhesive layers with ability for polyester bonding are well known in the art. Typical adhesive coatings include polyvinylidene chloride, acrylic terpolymer such as containing acrylonitrile or vinylidene chloride. The present invention is directed to removal of the adhesive from the polyester such that the polyester can be recycled for further use.

However, it is within the scope of the present invention that one or more additional layers are present in addition to the adhesive. Typically, one or more additional layers will be present such as developed and undeveloped photosensitive emulsions. It is understood that each of the coating layers may be composed of several polymers, including gelatin, and additives including but not limited to antistatic agents, sensitizers, stabilizers, and fillers including, in the case of photographic emulsion layers, silver halide or silver particles for photographic film that is unused ("green") or used ("black"), respectively.

An initial step in the present invention is to increase the ability of a stripping solution to separate the polyester film and an adhesive. Therefore, the polyester film-adhesive combination is formed into smaller particles, called flake herein, such as by chopping or grinding. The size of flake is not critical although preferred particle sizes may be present in a commercial mode such as for ease of handling or agitation in stripping.

Thereafter the polyester-adhesive flake is contacted with aqueous alkaline stripping solution. Such stripping solution typically contains hydroxide ion with preferred alkali being sodium hydroxide and potassium hydroxide or carbonates. A typical concentration of hydroxide ion is in a range from 0.3 wt% to 5 wt%, and preferably from 0.5 wt% to 2 wt%. The hydroxide ion in the stripping solution is believed to chemically react at the interface between the adhesive coating layer and the polyester film. More rapid kinetics are observed at elevated temperature such as 70° C. to 95° C. A preferred temperature range is from 85° C. to 95° C. wherein stripping is accompanied by agitation. Although lower temperature can be employed, a preferred mode employs elevated temperature.

It is required in the present invention that the stripping solution contains a surfactant. Typical surfactants which can be used in the stripping solutions of the present invention include but are not limited to combinations of anionic and nonionic surfactants such as Afilan CVH, nonyl phenol polyglycol ether (Hoechst Celanese) and Sulfonate OA-5R, the sodium salt of sulfonated oleic acid (Bit Manufacturing)

Triton QS-44, octylphenoxypolyethoxy-ethylphosphate and Triton N-111 nonylphenoxypolyethoxyethanol both available from Union Carbide or surfactants having both nonionic and anionic functionality such as Aerosol NPES-458, the ammonium salt of sulfated nonylphenoxypoly-(ethyleneoxy) ethanol (CyTec Inc).

It is understood that the stripping solution can be broader in scope since the solution can encompass further addition of one or more recycle streams as will be further discussed below in removal of adhesive from the polyester flake. The recycle streams conventionally will include solids such that the stripping solution with the recycle will be in the form of a dispersion.

After the adhesive coating layer is stripped from the polyester flake, the polyester flake is recovered from a slurry comprising the stripping solution and a solid residue of undissolved solids which results from the adhesive layer. Also in a conventional mode, at least one further coating layer is initially present in the starting material of the polyester film. Solids resulting from such layer or layers such are likewise present. In the case of photographic film, these solids include silver or silver halide particles.

The separated polyester flake is washed with a rinse stream which is typically water in a series of separate rinsing steps. After drying this flake is considered a suitable starting material for re-use, e.g., in direct extrusion.

However, it is necessary to separate the slurry into component parts of a clarified liquid and primarily solids which is called herein, a concentrate. Such separation into component parts can be physical or chemical or both. Physical separation includes settling or centrifugation with a hydrocyclone. For chemical separation, the separate addition of alkali hydroxide is desirable. The use of flocculating agents can be employed to aid in chemical separation but is not preferred for recycle.

In an alternate embodiment of the invention, a portion of the slurry is recycled as makeup for a portion of the aqueous stripping solution. Also, the clarified liquid can be recycled.

The aqueous alkaline stripping process of the present invention is considered to provide increased rinse efficiency for the stripped polyester film upon subsequent aqueous rinsing. The rinse efficiency as defined herein is a measure the rate of removal of solid residue from stripped polyester film by subsequent rinsing such that an equivalent film grade can be obtained with fewer rinse steps.

In the prior art alkaline stripping solutions containing above 1 wt% sodium hydroxide in the absence of surfactants are known to clarify upon standing, however solid residue inherently is retained or redeposited on the polyester film after separation from the slurry and this solid residue is difficult to remove upon subsequent rinsing. Addition of surfactants in the rinse step is insufficient to fully remove the residue from the film surface and therefore the polyester films are inferior in quality.

Prior art efforts to minimize deposition of solid residue from the slurry onto stripped film have utilized surfactants to emulsify the solid residue in stripping solution thereby achieving some improvement in the quality of the rinsed polyester film compared to stripping solutions without surfactant. The stability of the emulsified solid residue in the slurry after separation of the film makes it difficult to clarify the slurry to facilitate removal of a concentrated concentrate comprising solid residue. Attempts to remove the solid residue by filtration results in rapid filter plugging.

While not limited by theory, the surfactant used in aqueous alkaline stripping solutions of the present invention is believed to provide the following combination of functional properties (a) maintain a non-precipitating slurry comprising polyester flake and solid residue in stripping solution under agitation.

(b) minimize deposition of solid residue on the polyester film and provide efficient and effective rinsing of solid residue from the polyester film after separation from the slurry; and (c) readily clarify the slurry to form a concentrate containing the solid residue and a clarified liquid having a reduced concentration of solids residue suitable for recycle. Clarification may be achieved by settling in the absence of agitation and preferably involving flocculation through use of a flocculating agent or more preferably by centrifugation of the slurry using a hydrocyclone. The rate of clarification is preferably enhanced by increasing the residual hydroxide concentration.

The concept of recycle also is applicable to rinsing of polyester flake to obtain a high quality raw material useful, e.g., in direct extrusion. Counter-current contact with recycle obtained from the rinse stream can be employed with respect to flake flow. Ideally, fresh water is introduced only in the final rinse. The rinse is reused, whole or in part, in an earlier rinse step of stripped flake. To these earlier rinses can be added surfactants as rinse aids. These rinses also can eventually flow into the stripping bath where they are combined with clarified liquid from a previous batch.

Make-up alkali is optionally added to a portion of the slurry to aid in clarification, defeating surfactant stabilization of solid residue. The properties of the surfactant which are preferred allow caustic induced clarification and are considered to have maximum rinsing action at pH 8–13, more preferably pH 9–12. This pH profile in rinse is obtained by not neutralizing the stripping solution prior to flake separation, allowing alkali carried forward with the flake to create a basic environment or by addition of dilute alkali in rinse. Surfactants are also advantageous in the stripping solution to aid in loading dry flake and to enhance stripping solution drainage from the decoated flake.

To further illustrate the present invention the following examples are provided. All parts and percentages are by weight and degrees are in centrigrade unless otherwise indicated.

FILM GRADE AND SILVER GRADE

The amount of solid residue in a sample of melted flake was assessed by visual comparison of melted flake samples to a set of standards to assign a film grade (a measure of the amount of polyvinylidene chloride residue) and a silver grade (a measure of the amount of silver residue). Lower values for the film grade and silver grade correspond to a reduced concentration of solid residue in the washed flake and are a useful measure of the rinse efficiency in removing solid residue.

Test samples were prepared by weighing 5 grams of the dried flake into a silicone release coated aluminum weighing dish (Dow Corning) and then melting the flake on a hot plate at 350° C. for three to five minutes minimizing exposure at an elevated temperature to avoid polymer bubbling and thermal degradation. The melted sample was rapidly quenched into cold water to avoid crystallization producing a transparent amorphous disk. The polymer disk was removed from the aluminum dish, viewed at 10×in a microscope with transmitted light and visually ranked in comparison with known standards.

Standards were prepared by mixing chopped film flakes with and without a polyvinylidene chloride adhesive coating and melting the flakes to form comparative visual standards of varying concentration using the same melting and quenching procedure used to prepare the test samples. The coated polyester film was Cronar®442 photographic base (DUPONT, WILMINGTON, Del.). The film grade standard and its corresponding concentration of the coated flake are as follows 0.5 (0.5 wt %), 1.0 (1.5 wt %), 2.0 (3.0 wt %), 3.0 (4.5 wt %), 4.0 (6.0 wt %), 5 (7.5 wt %), 6 (9.0 wt %) and 7 (10.5 wt %).

The film grade, a measure of the concentration of polyvinylidene chloride in a sample, was assigned by comparative visual matching of the test sample with the appropriate standard viewed under a microscope at 10×magnification with transmitted light. The polyvinylidene polymer turned dark red at the temperature used to melt the flake and thus was easily distinguished from the clear background of the amorphous PET. The coating pieces ranged from small particles to wispy thin flakes with curled strands of stripped adhesive coating being most common in rinse-limited samples. The adhesive coating which had not been stripped from the polyester film had a diffuse red appearance and covered a larger area. The film grade was assigned based on the overall color concentration and number of red regions per area. If the test sample fell between two standards larger than grade 1, an intermediate half-grade value was assigned.

Silver and silver halide particles appear black in transmitted light and thus can be clearly distinguished from the red areas due to the adhesive polymer coating. The silver grade, a measure of the concentration of silver in a melted flake sample, was assigned by visual comparison of the concentration of black particles with the red particle concentration in the standards.

Examples were conducted using the following standard experimental procedure for stripping and rinsing the polyester flake. Surfactant type, concentration, and variations from the standard procedure are indicated in the specific examples.

A 4-liter stainless steel beaker was equipped with stainless steel baffles, cover, and overhead stirrer with a stainless steel shaft to drive three triple-bladed three inch diameter impellers spaced one inch apart. The bottom impeller was within one inch of the bottom of the beaker. Polyester film flake, surfactant, and 2 liters of water were charged to the beaker. The mixture was heated to 90° C. while mixing at 1400 rpm, then sodium hydroxide was added over one minute. The mixture was stirred at a constant elevated temperature for a sufficient time to strip the adhesive resin layer from the polyester film. The minimum stripping time for the films used in the examples was found to be 30 minutes in 0.5 wt % sodium hydroxide for Cronar 780 B base film, 30 minutes in 1.0 wt % sodium hydroxide for DuPont UVL medical x-ray film exposed and processed to an optical density of 1.0 ("black" film), and 60 minutes in 1.0 wt% sodium hydroxide for unexposed and unprocessed DuPont UVL medical x-ray film ("green" film) at a stripping temperature of 92° C. to 93° C. The stripping time was reduced at higher concentrations of sodium hydroxide. After stirring for a sufficient time, the contents of the beaker were then poured onto a 0.033, No. 20 sieve mesh stainless steel screen to separate the flake from the washing solution. A 10 gram sample of flake was rinsed with cold water and set aside (CR =flake after cold water rinse). The slurry comprising the stripping solution, surfactant, and solid residue (from the adhesive coating layer and any overlying photographic emulsion layers) was retained. The balance of the flake was returned to the reaction beaker and rinsed by adding hot water raising the temperature to at least 70° C. and stirring under slow agitation for about three minutes. The flake was separated from the first rinse solution by pouring over the screen. The first rinse solution was retained and a 10 gm sample of the rinsed flake which was taken and set aside to dry. Subsequent rinses were completed in a similar fashion taking a 10 gram sample of flake after each rinse step. (R1 =flake after first rinse, R2=flake after second rinse). Materials employed in the following examples include:

DuPont Cronar®780 base film, a coated polyethylene terephthalate photographic film base which contains an adhesive coating layer of vinylidene chloride copolymer.

DuPont UVL® medical x-ray film was used for "green" film (unexposed and unprocessed) and for "black" film (exposed and processed to an optical density of 1.0).

The films are commercially available from DuPont (WILMINGTON, Del.)

Films were ground to form flake using a Cumberland 8X12 Gran 3KN laboratory granulator equipped with a screen over the exit port. The nominal flake size corresponds to the screen mesh size through which the flake exits the grinding process. No effort was made to fractionate the flake to eliminate fines. Flakes made from the DuPont UVL medical x-ray film were observed to have embedded silver due to incomplete cuts made by the blade.

EXAMPLE 1

The stripping conditions required to obtain rinse-limited stripping of the adhesive coating layer from flake made from DuPont black film were determined for 20% flake solids in a stripping solution of 2 liters of water with 0.1 wt % Afilan CVH nonionic surfactant, 0.1wt % Sulfonate OA-5R anionic surfactant, and 0.54 wt % sodium hydroxide as a function of temperature and time. A film grade of 1.0 is attained in less than a hour at 92° C. to 94° C., about two hours at 83° to 85° C., and requires more than 2 hours at 75° C. to 76° C.

| 92° C. to 94° C. | | 83° C. to 85° C. | | 75° C. to 76° C. | |
| --- | --- | --- | --- | --- | --- |
| time | film grade | time | film grade | time | film grade |
| 0.07 | 3.5 | 0.08 | 5.0 | 0.08 | 6.0 |
| 0.17 | 2.0 | 0.17 | 4.0 | 0.18 | 5.0 |
| 0.25 | 1.5 | 0.27 | 3.0 | 0.28 | 4.5 |
| 0.33 | 1.5 | 0.37 | 2.5 | 0.38 | 4.0 |
| 0.50 | 1.0 | 0.55 | 2.5 | 0.55 | 3.5 |
| 0.67 | 1.0 | 0.75 | 2.0 | 0.75 | 3.0 |
| 1.02 | 1.0 | 1.08 | 1.5 | 1.12 | 2.5 |
| 1.53 | 1.0 | 2.01 | 1.0 | 2.00 | 2.0 |

*time is in hours

EXAMPLE 2

The effect of adjusting the pH of the stripping solution prior to separation of the flake on the rinse efficiency and resultant flake quality was determined. The adhesive coating layer was stripped from 500 gms of 0.75 inch diameter flake from DuPont UVL black film by stirring 30 minutes at 92 C.

to 93 C. in 2 liters of 1.5 wt % sodium hydroxide aqueous stripping solution (16.5 wt % flake loading). Surfactants added to the stripping solution are indicated in the tables. The effect of pH on surfactant rinse efficiency was examined by neutralizing the stripping solution with sulfuric acid to the indicated pH prior to rinse. The volume of water used to rinse the flake under agitation at 70° C. in the rinse steps were R1=1.2 liters, R2=1.1 liters and R3 to R6 each employed 1.0 liters of water. The film grade and silver grade of the flake was presented in the tables as a function of rinse.

Rinsing produced a film grade of less than 2.0 over almost the full breadth of starting pH. Enhanced rinse efficiency was observed over the pH range between pH 13.4 and pH 9 with a film grade of 1.0 being attained with the stripping solution at pH of about 13. Neutralization of the stripping solution to pH 10.3 or less prior to separation of the flake lowered rinse effectiveness resulting in a film grade of 1.5 or higher after six rinse steps. The rinse efficiency to reach a film grade of 1.0 with the fewest number of rinses was best when the stripping solution was at a pH of about 13 which allows the rinse pH to decrease gradually during successive rinse steps remaining above a pH 8 due to dilution of the residual stripping solution carried over on the flake after draining. It is estimated that approximately 20% of the rinse volume is retained on the drained flake resulting in a decrease of approximately 0.5 pH units per rinse cycle.

| Surfactant: 0.1 wt % Afilan CVH and 0.1 wt % Sulfonate OA-5R | | | | | | | | |
|---|---|---|---|---|---|---|---|---|
| initial pH | grade | CR | R1 | R2 | R3 | R4 | R5 | R6 |
| 13.4 | film | 5.0 | 2.5 | 2.0 | 1.5 | 1.5 | 1.5 | 1.0 |
|  | silver | 6.0 | 3.0 | 1.5 | 1.0 | 0.5 | 0.5 | 0.5 |
| 13.1 | film | 4.0 | 3.0 | 2.0 | 2.0 | 1.5 | 1.0 | 1.0 |
|  | silver | 5.0 | 2.0 | 1.0 | 0.5 | 0.5 | 0 | 0 |
| 10.3 | film | 5.0 | 3.0 | 2.0 | 2.0 | 2.0 | 1.5 | 1.5 |
|  | silver | 5.0 | 3.0 | 1.5 | 1.0 | 1.0 | 1.0 | 1.0 |
| 9.1 | film | 5.0 | 3.5 | 2.0 | 2.0 | 2.0 | 1.5 | 1.5 |
|  | silver | 6.0 | 3.5 | 1.5 | 1.0 | 1.0 | 1.5 | 1.0 |
| 6.5 | film | 6.0 | 3.0 | 2.0 | 2.0 | 2.0 | 2.0 | 1.5 |
|  | silver | 6.0 | 4.0 | 2.0 | 1.5 | 1.5 | 1.5 | 1.5 |
| 5.5 | film | 6.0 | 3.0 | 2.0 | 2.0 | 2.0 | 2.0 | 1.5 |
|  | silver | 7.0 | 4.0 | 2.5 | 2 | 1.5 | 1.5 | 1.5 |
| 3.1 | film | 7.0 | 3.0 | 3.0 | 2.0 | 2.0 | 2.0 | 2.0 |
|  | silver | 7.0 | 5.0 | 3.0 | 2.0 | 2.0 | 1.5 | 1.5 |

EXAMPLE 3

The pH dependence of rinse efficiency and flake quality 10 was determined for stripped flake from DuPont Cronar 780 base film as a function of surfactant in the stripping solution. The adhesive coating was stripped from 400 gms of 0.75 inch ground flake for 30 minutes at 92° C. to 93° C. using 2 liters of 0.5 wt % sodium hydroxide and surfactants as indicated in the tables as a stripping solution (16.5 wt % solids loading). The effect of pH on surfactant rinse efficiency was examined by neutralizing the stripping solution with sulfuric acid to the indicated pH prior to rinse. Rinses R1 to R6 each employed 1.0 to 1.2 liters of water at 70° C. to 80° C.

Samples A through D of the present invention show rinse limited performance to film grade 1 within six rinse cycles for pH 9 and above. Rinse efficiency to reach a film grade of 1.0 was better for the unneutralized stripping solution (sample A). The rate of clarification of the stripping bath was observed for pH 12.7 and pH 10.8. The clarification of the pH 12.7 bath after 24 hours settling was greater than that achieved for the pH 10.8 bath after 48 hours settling. Thus, a higher quality clarified liquid could be obtained for the pH 12.7 stripping solution with reduced concentration of solid residue compared to the pH 10.8 clarified liquid under equal conditions.

Comparative stripping solutions A and B were prepared according to U.S. Pat. No. 5,366,998 examples 40, 41 and 42. Comparative solution A (example 41) is reported in U.S. Pat. No. 5,366,998 to result in unsatisfactory film quality. Comparative stripping solution B (example 42) wherein reducing sugar is added and is reported to increase the removal of PVDC based resin layer compared to Comparative solution A. However, stripping solution B does not produce film grade 1.0 regardless of adjustment of the stripping solution pH prior to separation of the stripped flake.

| STRIPPING SOLUTION 1 Surfactant: 0.1 wt % Afilan CVH and 0.1 wt % Sulfonate OA-5R | | | | | | | | | |
|---|---|---|---|---|---|---|---|---|---|
| | | | Rinse | | | | | | |
| Sample | pH | Grade | NR | R1 | R2 | R3 | R4 | R5 | R6 |
| A | 12.7 | film | 5.0 | 3.5 | 2.5 | 2.0 | 1.5 | 1.0 | 1.0 |
| B | 10.8 | film | 5.0 | 3.0 | 2.5 | 2.0 | 1.5 | 1.5 | 1.0 |
| C | 8.5 | film | 5.0 | 3.0 | 2.5 | 2 | 1.5 | 1.5 | 1.0 |
| D | 6.0 | film | 5.0 | 3.5 | 2.5 | 2 | 1.5 | 1.5 | 1.5 |

| COMPARATIVE STRIPPING SOLUTION A US 5,366,998 Example 41 | | | | | | | | | |
|---|---|---|---|---|---|---|---|---|---|
| | | | Rinse | | | | | | |
| Sample | pH | Grade | NR | R1 | R2 | R3 | R4 | R5 | R6 |
| E | 12.2 | film | 6.0 | 5.0 | 4.0 | 3.5 | 3.5 | 3.0 | 3.0 |
| F | 8.7 | film | 4.5 | 3.5 | 3.5 | 3.0 | 3.0 | 3.0 | 2.0 |
| G | 6.5 | film | 5.0 | 4.0 | 3.5 | 3.5 | 3.0 | 3.0 | 2.5 |

| COMPARATIVE STRIPPING SOLUTION B US 5,366,998 Example 42 | | | | | | | | | |
|---|---|---|---|---|---|---|---|---|---|
| | | | Rinse | | | | | | |
| Sample | pH | Grade | NR | R1 | R2 | R3 | R4 | R5 | R6 |
| H | 11.8 | | 6.0 | 5.0 | 4.0 | 3.5 | 3.5 | 3.0 | 3.0 |
| I | 8.9 | film | 4.5 | 4.0 | 3.5 | 3.5 | 3.0 | 3.0 | 2.5 |
| J | 6.7 | film | 5.0 | 4.0 | 3.5 | 3.5 | 3.0 | 2.5 | 2.0 |

EXAMPLE 4

The efficiency and effectiveness of rinsing the solid residue from stripped flake formed from "green" DuPont UVL medical x-ray film was determined with and without added surfactant. The adhesive coating and overlying emulsion layer were stripped from 650 gms of 0.75 inch flake for 30 minutes at 92° C. to 93° C. using 2 liters of 1.5 wt % sodium hydroxide (24 wt % flake loading) and surfactants contained in the stripping solution as indicated in the tables. The effect of pH on surfactant rinse efficiency was examined by neutralizing the stripping solution with sulfuric acid to the indicated pH prior to removal of the flake. Rinses R1 to R6 each employed 1.2 liters of water at 70° C. The quality of the rinsed flake is reported as a function of rinse step.

Rinse effectiveness, the ability to remove the solids residue, is poor when no surfactant is added to the stripping solution. The film grade and silver grade attained after six rinse steps was only 3.0.

The rinse efficiency, the number of rinses required to reach an adhesive coating grade below 2, is improved for stripping solutions of the present invention.

The stripping solutions of the present invention containing 1.5 wt % sodium hydroxide clarified after 1 hour while the comparative stripping solution C prepared according to U.S. Pat. No. 5,366,998 example 1 remain substantially unclarified after 24 hours settling. The ease of clarification of stripping solutions of the present invention is a benefit since it allows separation of the stripping solution into a clarified liquid and a concentrate containing the solid residue thereby facilitating recycle of a portion of the clarified liquid for use in a subsequent stripping solution.

Surfactant: None

| pH | Grade | NR | R1 | R2 | R3 | R4 | R5 | R6 |
|---|---|---|---|---|---|---|---|---|
| 13.5 | Film | 6.0 | 5.0 | 4.0 | 3.0 | 3.0 | 3.5 | 3.0 |
|  | Silver | 7.0 | 6.0 | 4.5 | 4.0 | 4.0 | 3.5 | 3.0 |

Surfactant: 0.1% Afilan CVH and 0.1 wt % Sulfonate OA-5R

| pH | Grade | NR | R1 | R2 | R3 | R4 | R5 | R6 |
|---|---|---|---|---|---|---|---|---|
| 13.5 | Film | 6.0 | 5.0 | 4.0 | 2.5 | 1.5 | 1.5 | 1.5 |
|  | silver | 7.0 | 6.0 | 4.0 | 2.0 | 2.0 | 1.5 | 1.5 |
| 12.5 | film | 5.5 | 4.0 | 3.0 | 2.5 | 1.5 | 1.0 | 1.0 |
|  | silver | 6.0 | 5.0 | 3.0 | 2.0 | 2.0 | 2.0 | 1.5 |
| 9.5 | film | 5.0 | 4.0 | 3.0 | 2.0 | 1,5 | 1.5 | 1.5 |
|  | silver | 6.0 | 5.0 | 3.0 | 2.0 | 2.0 | 2.0 | 1.5 |
| 7.0 | film | 6.0 | 5.0 | 4.0 | 3.0 | 2.0 | 1.5 | 1.5 |
|  | silver | 7.0 | 5.0 | 4.0 | 2.0 | 2.0 | 2.0 | 2.0 |
| 3.2 | film | 7.0 | 5.0 | 4.0 | 3.0 | 2.0 | 2.0 | 2.0 |
|  | silver | 7.0 | 7.0 | 5.0 | 3.0 | 2.0 | 2.0 | 2.0 |

Surfactant: 0.1 wt % Triton QS-44 and 0.1 wt % Triton N-111

| pH | Grade | CR | R1 | R2 | R3 | R4 | R5 | R6 |
|---|---|---|---|---|---|---|---|---|
| 13.0 | film | 6.0 | 5.0 | 4.0 | 2.5 | 2.0 | 1.5 | 1.5 |
|  | silver | 7.0 | 5.0 | 4.0 | 3.0 | 2.0 | 2.0 | 2.0 |

Surfactant: 0.1 wt % NPES

| pH | Grade | CR | R1 | R2 | R3 | R4 | R5 | R6 |
|---|---|---|---|---|---|---|---|---|
| 13.2 | film | 7.0 | 5.0 | 4.0 | 3.5 | 2.5 | 2.0 | 1.5 |
|  | silver | 6.0 | 3.0 | 3.0 | 2.0 | 1.5 | 1.5 | 1.5 |

COMPARATIVE EXAMPLE
US 5,366,998 Example 1
Comparative Stripping solution C

| pH | Grade | CR | R1 | R2 | R3 | R4 | R5 | R6 |
|---|---|---|---|---|---|---|---|---|
| 13.1 | film | 6.0 | 5.0 | 4.0 | 3.5 | 3.0 | 2.5 | 2.0 |
|  | silver | 6.0 | 4.0 | 2.5 | 2.0 | 2.0 | 1.5 | 1.0 |
| 12.5 | film | 6.0 | 5.0 | 4.0 | 3.0 | 3.0 | 2.0 | 2.0 |
|  | silver | 6.0 | 4.0 | 2.5 | 2.0 | 2.0 | 1.0 | 1.5 |
| 10.1 | film | 5.0 | 4.0 | 3.5 | 3.0 | 2.5 | 2.5 | 2.0 |
|  | silver | 7.0 | 5.0 | 3.0 | 3.0 | 2.5 | 2.0 | 2.0 |
| 8.7 | film | 5.0 | 4.0 | 3.5 | 3.0 | 2.0 | 2.0 | 1.5 |
|  | silver | 7.0 | 5.0 | 3.0 | 3.0 | 2.5 | 2.0 | 2.0 |
| 6.5 | film | 7.0 | 4.0 | 3.5 | 3.0 | 2.5 | 2.0 | 2.0 |
|  | silver | 7.0 | 6.0 | 3.5 | 3.5 | 3.0 | 2.0 | 2.0 |
| 3.0 | film | 7.0 | 5.0 | 4.0 | 3.5 | 2.5 | 2.5 | 2.5 |
|  | silver | 7.0 | 6.0 | 4.0 | 3.5 | 3.0 | 2.5 | 2.5 |

EXAMPLE 5

80% RECYCLE

This example illustrates the ability of stripping solutions of the present invention to effectively strip green film at up to 80 volume % recycle.

800 grams of 0.5 inch flake from green DuPont UVL medical x-ray film was stripped for one hour at 90° C. using a stripping solution of 1.5 wt % sodium hydroxide in 2.0 liters of water containing 1.1 gm of Afilan CVH and 0.9 grams of Sulfonate OA-SR. The stripped flake was retained from the stripping solution without neutralization and successively rinsed and drained using one liter of water at 70° C. for each rinse step. The stripping solution was collected and 80 volume % and was recycled to strip a second batch of flake with 20 vol % of a make-up stripping solution containing 0.55 wt % Afilan and 0.45 wt % of Sulfonate OA-5R with 25 grams of a 50% sodium hydroxide (the slightly higher amount of sodium hydroxide is required to maintain the pH of the stripping solution at 13.6 compensating for hydroxide ion consumed during the stripping process, presumably in the reduction of silver ion to silver). Two parallel runs were made at the 80% recycle of stripping solution: a first case without clarification of the stripping solution in which the stripping solution was mixed immediately before charging the recycle portion to avoid clarification and a second case in which the stripping solution was clarified by settling for one hour after which the clarified liquid was decanted and used as the recycle portion. The clarified stripping solution thus contained approximately a constant level of solids residue with successive recycle steps (although the dissolved solids content increased) while the unclarified recycle stripping solution steadily increased in concentration of both solid residue as well as dissolved solids during successive recycle steps. After stripping for an hour at 90° C., the second stripped flake was drained and the stripping solution collected for recycle and so forth. A comparison of rinse-limited film grade of the initial flake batch (A) stripped and the four batches of flake (B, C, D, and E) stripped using recycled stripping solution is presented in the following tables.

This example demonstrates that rinse limited stripping can be accomplished with up to 80 volume % recycle. The value of clarification to remove solids residue from the stripping solution is evidenced particularly in the increased silver grade for flake washed with the unclarified recycle in comparison to the clarified recycle. The rinse effectiveness for flake stripped using the unclarified stripping solution is degraded by carryover of the silver particles even in the first cycle. The difficulty in removal of the silver increases with successive batches of flake processed since the concentration of solid residue increases in the stripping solution with each cycle due to the lack of clarification.

| Cycle | Recycle factor | R1 | R2 | R3 | R4 | R5 | R6 |
|---|---|---|---|---|---|---|---|
| 80% recycle of unclarified stripping solution | | | | | | | |
| A | 1.0 | 4.0 | 3.0 | 2.0 | 1.5 | 1.0 | 1.0 |
|  |  | 5.0 | 3.0 | 3.0 | 2.0 | 2.0 | 1.0 |
| B | 1.8 | 5.0 | 4.0 | 3.0 | 2.0 | 1.5 | 1.0 |
|  |  | 6.0 | 4.0 | 3.0 | 2.0 | 2.0 | 2.0 |
| C | 2.4 | 6.0 | 5.0 | 3.0 | 2.5 | 2.0 | 1.5 |
|  |  | 7.0 | 4.0 | 3.0 | 2.0 | 2.0 | 2.0 |
| D | 3.0 | 6.0 | 5.0 | 3.5 | 3.0 | 2.0 | 1.5 |
|  |  | 7.0 | 4.0 | 3.0 | 3.0 | 2.0 | 2.0 |
| E | 2.4 | 6.0 | 5.0 | 4.0 | 3.5 | 2.5 | 1.5 |
|  |  | 7.0 | 5.0 | 4.0 | 3.0 | 3.0 | 3.0 |
| 80% recycle of clarified stripping solution | | | | | | | |
| A | 1.0 | 4.0 | 3.0 | 2.0 | 1.5 | 1.0 | 1.0 |
|  |  | 5.0 | 3.0 | 3.0 | 2.0 | 2.0 | 1.0 |
| B | 1.8 | 4.0 | 3.0 | 2.0 | 1.5 | 1.0 | 1.0 |
|  |  | 5.0 | 3.0 | 2.0 | 2.0 | 2.0 | 1.0 |
| C | 2.4 | 5.0 | 4.0 | 3.0 | 2.0 | 1.5 | 1.0 |
|  |  | 6.0 | 3.0 | 3.0 | 2.0 | 2.0 | 1.0 |
| D | 3.0 | 5.5 | 4.5 | 3.0 | 2.0 | 1.5 | 1.5 |
|  |  | 6.0 | 3.0 | 3.0 | 2.0 | 2.0 | 1.0 |
| E | 2.4 | 6.0 | 5.0 | 3.5 | 2.5 | 2.0 | 1.5 |
|  |  | 6.0 | 4.0 | 3.5 | 3.0 | 2.0 | 2.0 |

EXAMPLE 6

This example demonstrates stripping multiple batches of green flake using a stripping solution comprising 50 volume % recycle of clarified slurry and demonstration of rinse-limited stripping conditions by improving rinse efficiency through addition of surfactant to the rinse.

The coating layers were stripped from 800 grams of 0.75 inch flake formed from green DuPont UVL medical x-ray film by mixing 2 liters of stripping solution comprising 1.0 wt % of sodium hydroxide with 0.11 wt % Afilan CVH and 0.09 wt % Sulfonate OA-5R for an hour at 92° C. to 93° C. The flake was separated from the stripping solution without neutralization and drained. The flake was successively rinsed by mixing the flake with the water (and optionally surfactants as specified) at 70° C. after which the flake was separated from the rinse retaining a 10 gram flake sample and the rinse solution from each rinse step. The film grade of the retained flake was evaluated for adhesive coating and silver as indicated in the following tables. The first rinse step used 1.2 liters of water containing 0.33 g of Afilan CVH and 0.27 gm of Sulfonate OA-SR. The second rinse used 1.1 liters of hot water, 0.55 gm of Afilan CVH and 0.45 gm of Sulfonate OA-SR. Subsequent rinse step used 1.1 liter of water without added surfactant. The film quality was excellent with film grade 1.0 after the fifth and sixth rinse steps.

A second batch of 800 gms of the green flake, Batch B, was stripped in 2 liters of a second stripping solution with 50 vol % recycle of CSA, the clarified stripping slurry recovered from Batch A. The stripping solution constituted a liter of CSA clarified stripping slurry from batch A, 800 gms of clarified R1A, the first rinse solution from rinsing Batch A flake, and 200 grams of clarified R2A, the second rinse solution from Batch A flake, 0.66 gms of Sulfonate and 0.55 grams of OA-5R and 20 grams of a 50% NaOH. Only about a third of the amount of additional surfactant and half of the amount of additional sodium hydroxide was required to be added to the recycled solutions to achieve equivalent levels of sodium hydroxide and surfactants in the second stripping solution as in the first stripping solution. After stripping the Batch B flake, the flake was separated from slurry B (which was retained for subsequent use in preparing the stripping solution for Batch C flake) and the drained flake was successively rinsed by mixing the flake with the specified rinse mixture at 70° C. after which the flake was separated and drained, retaining a 10 gram flake sample and the rinse solution at each rinse step. Flake B was subjected to a first rinse step using a first rinse mixture constituting 500 milliliters of clarified R2A, the rinse solution retained from the second rinse used for Batch A flake, and 600 milliliters of clarified R3A, the rinse solution retained from rinse 3 of Batch A flake. After separation of the Batch B flake, the rinse solution R1B from the first rinse step was retained for subsequent use as a component in the stripping solution for Batch C flake. The Batch B flake was subjected to a second rinse step using a second rinse mixture constituting 400 milliliters of R3A, 600 milliliters of R4A, 0.55 grams of CVH, and 0.45 grams of OA-SR. After separation of the Batch B flake, the rinse solution R2B from the second rinse step was retained for subsequent use as a component in the stripping solution and the first rinse for batch C flake. Flake B was then subjected to a third rinse step using a third rinse mixture constituting 300 milliliters of R4A and 700 milliliters of R5A. After separation of the Batch B flake, the rinse solution R3B from the third rinse step was retained for subsequent use as a component in the first and second rinse mixtures for batch C flake. Flake B was then subjected to a fourth rinse step using a fourth rinse mixture constituting 200 milliliters of R5A and 800 milliliters of R6A. After separation of the Batch B flake, the rinse solution R4B from the third rinse step was retained for subsequent use as a component in the second and third rinse mixtures for batch C flake. Flake B was subjected to fifth and sixth rinses each of which utilized one liter of water yielding rinse solutions R5B and R5C, respectively, which were retained for subsequent use in rinse mixtures for batch C flake. The fifth and sixth rinses were with 1000 ml of hot water. Further batches of flake were similarly stripped using the same proportions of recycled clarified stripping slurry and rinse solutions from the previous cycle. Stripped flake having both a film grade and silver grade of 1.0 was still obtained after processing six batches of flake.

| Cycle | Rinse | | | | | |
| --- | --- | --- | --- | --- | --- | --- |
| | R1 | R2 | R3 | R4 | R5 | R6 |
| 50% Recycle | | | | | | |
| A | 5.0 | 4.0 | 3.0 | 1.5 | 1.0 | 1.0 |
| | 5.0 | 3.0 | 2.0 | 2.0 | 1.0 | 1.0 |
| D | 6.0 | 5.0 | 3.5 | 2.0 | 2.0 | 1.5 |
| | 5.0 | 4.0 | 2.0 | 2.0 | 2.0 | 2.0 |
| WITH ADDITION OF SURFACTANT IN R1 AND R2 | | | | | | |
| F | 5.0 | 4.0 | 3.0 | 2.0 | 1.5 | 1.0 |
| | 5.0 | 3.0 | 2.0 | 2.0 | 2.0 | 1.0 |

What is claimed is:

1. A process for removal of an adhesive coating layer from polyester film comprising the steps of:

(a) forming a section of film into a series of flakes, (b) contacting the flakes with an aqueous alkaline stripping solution comprising a surfactant selected from the group consisting of (i) an anionic surfactant and a nonionic surfactant and (ii) a surfactant having both anionic and nonionic functionality whereby the adhesive coating is removed from the polyester, (c) separating undissolved solids from step (b) to recover separately polyester flake and a slurry comprising stripping solution, surfactant and a solid residue resulting from the adhesive coating layer, (d) rinsing the polyester flake with a rinse stream, (e) separating the slurry into a clarified liquid and a concentrate, (f) repeating step (a) through step (d) on additional flake with at least a portion of the clarified liquid from step (e) recycled into step (b).

2. The process of claim 1 wherein step (a) through step (d) is repeated with a portion of the slurry for step (c) recycled into step (b).

3. The process of claims 1 or 2 wherein additional alkali is added to the slurry prior to step (e).

* * * * *